H. B. MYER.
Car-Seat
No. } 123, 1,227. { Reissued Oct. 8. 1861
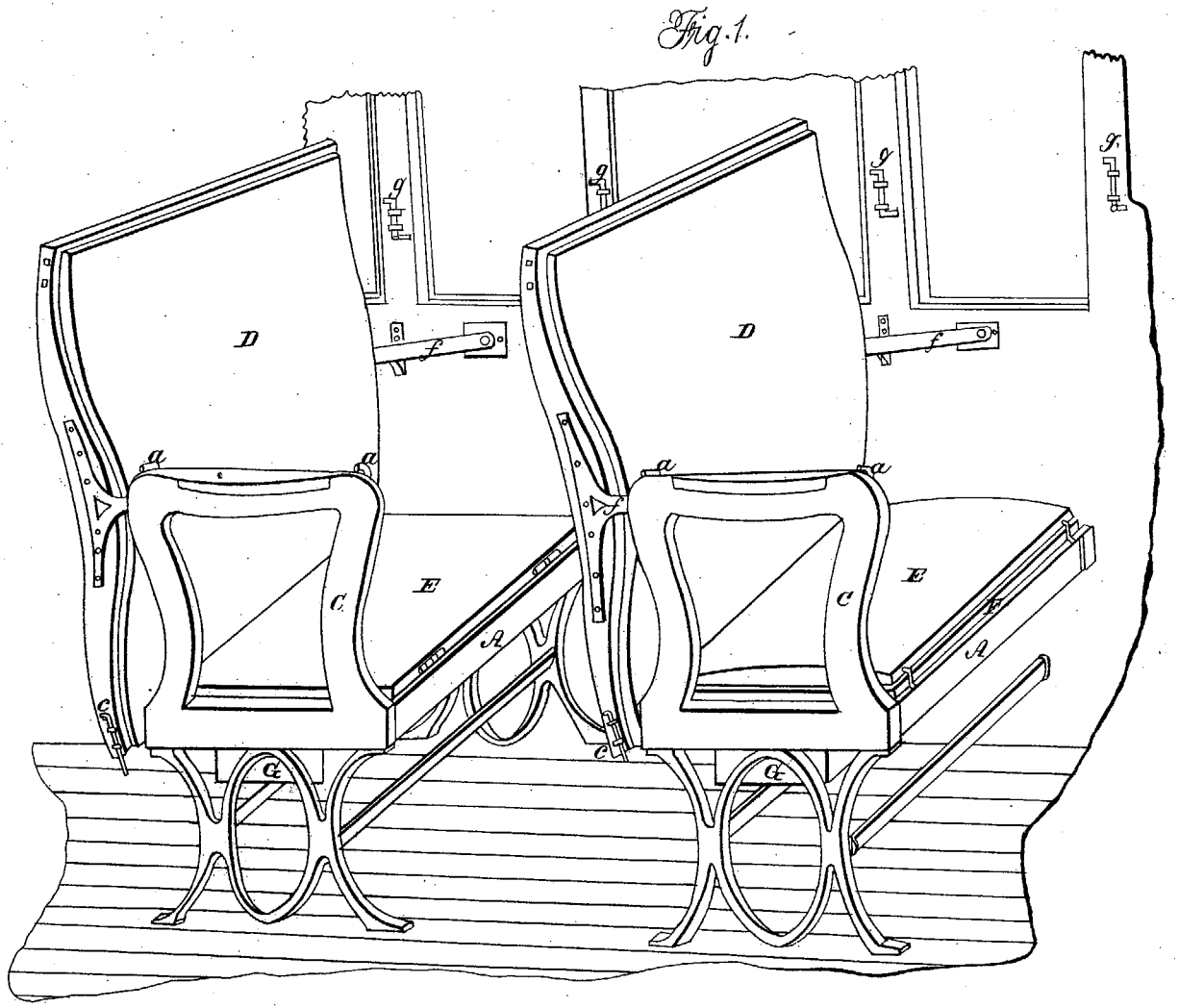
N. PETERS, PHOTO-LITHOGRAPHER, WASHINGTON, D. C.

H. B. MYER.
Car-Seat.
No. { 123, 1,227. }
Reissued Oct. 8. 1861
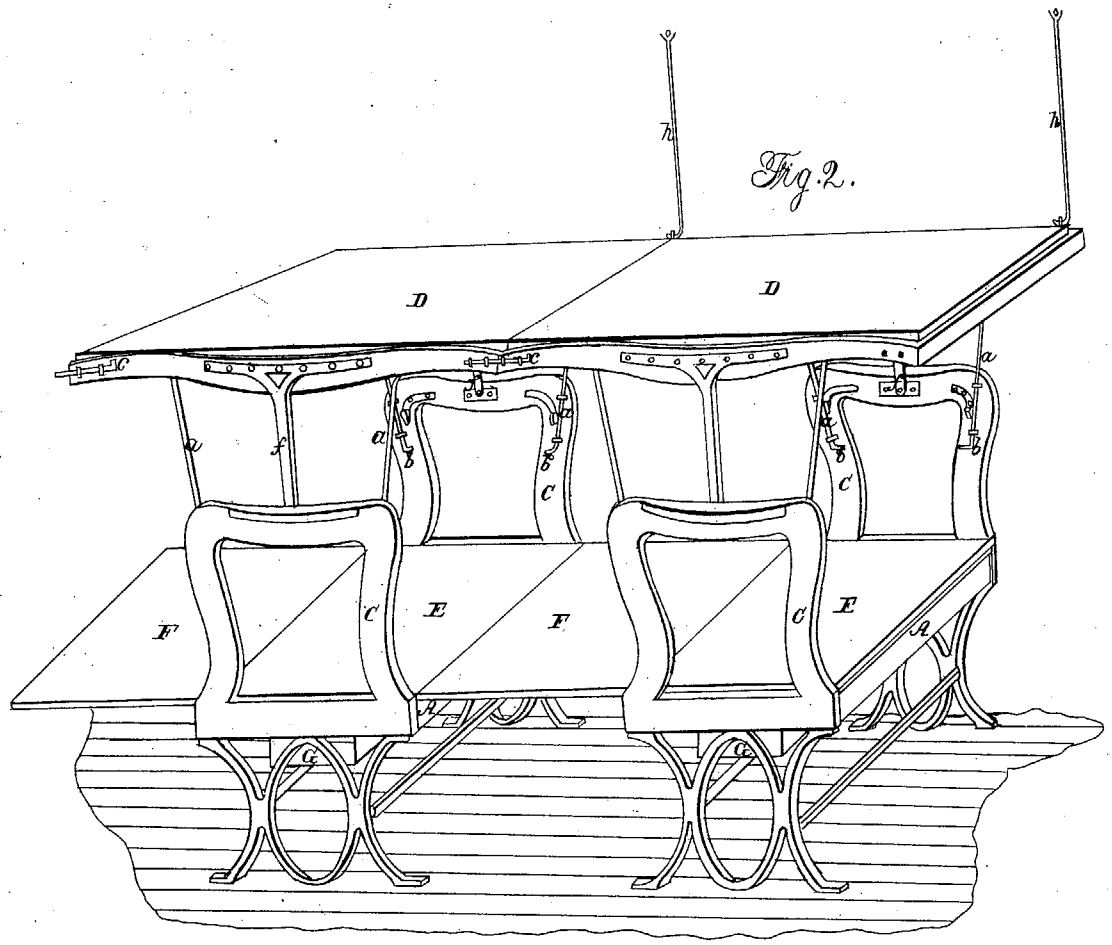
H. PETERS, PHOTO-LITHOGRAPHER, WASHINGTON, D. C.

UNITED STATES PATENT OFFICE.

HENRY B. MYER, OF CLEVELAND, OHIO.

IMPROVEMENT IN CONVERTING RAILROAD-CAR SEATS INTO BEDS OR LOUNGES.

Specification forming part of Letters Patent No. 11,699, dated September 19, 1854; Reissue No. 711, dated May 3, 1859; Reissue No. 1,227, dated October 8, 1861.

*To all whom it may concern:*

Be it known that I, HENRY B. MYER, of Cleveland, in the county of Cuyahoga and State of Ohio, (formerly of Buffalo, in the county of Erie and State of New York,) have invented a new and improved mode of constructing the seats of railroad-cars so that they may be converted into beds or berths; and I do hereby declare that the following is a full, clear, and exact description of the nature and operation of my said invention, taken in connection with the accompanying drawings, which make a part of this specification, in which—

Figure 1 represents two seats of a railroad-car and the manner in which the parts of the same are arranged when they are used as seats; and Fig. 2 represents the manner in which the same parts are arranged when they are used to form beds or berths.

The subject-matter of my invention relates to the manner of constructing and arranging the parts which form the seats of a railroad-car so that they may be used as seats capable of accommodating the usual number of passengers carried in a car, and may also be converted into beds or berths sufficient for the same number of persons.

In the modes of construction heretofore adopted in the attempts to construct sleeping-cars so that the seats could be converted into beds or berths the seats were arranged lengthwise of the car and of a length sufficient for a berth, with the backs of the seats placed outward or against the side of the car, like an omnibus. This manner of arranging the seats rendered it easy to convert the same into berths, because all the cushions were of the length required, and they were placed lengthwise of the car, as was required for the berths; but they were very objectionable to the passengers, as they were obliged to ride with their backs to the windows.

The purpose of my invention is to construct the seats of the ordinary length for seating two persons, arranged transversely to the body of the car on each side of a central passage-way, as is the usual mode, so that they may still be converted into berths extending lengthwise of the car. In this case the length of the seat is the measure of the width of the berth instead of the length thereof, as before practiced, and to get the requisite length for the berths the separate parts forming the seats are placed horizontally side by side in combination with a sufficient width of accessory or supplementary parts or cushions of the same length, so that the parts of the seats in combination with the supplementary parts or cushions shall be sufficient to form two series of beds or berths of the proper length, which will afford space for as many persons to lie down as can be seated. The seats are to be used in pairs, each two seats forming a compartment, and occupying a space in the length of the car sufficient for the length of a berth, or about six feet. A pair of seats only are therefore shown in the drawings, and these are repeated a sufficient number of times to fill the length of the car, which is constructed with reference to this dimension.

In the drawings, A A represents the frames of the seats, supported by ornamental iron brackets, and arranged along the sides of the car in the usual manner. C C are the arm-frames. D D are the cushioned frames that form the backs of the seats. They are connected with the arm-frames by strong stirrups *f f*, and also with the sides of the car in the usual way, so as to be reversed. The frames of the backs and the stirrups and the arm-frames are made of sufficient strength to support the weight of the passengers when they are turned to a horizontal position, as is shown in Fig. 2. They are also made much wider than is necessary for forming backs to the seats merely, an extra or supplementary width being added to each side sufficient to give a breadth equal to the space in the length of the car occupied by each seat, so that when the two adjacent backs that are used in connection with each other are turned up to a horizontal position to form berths, as in Fig. 2, their edges will just meet, and their upper surfaces will be in the same plane. Both sides of the back-frames are cushioned, and the side next the seat is curved for greater ease to the passenger, but the opposite side is made plain. This additional width of the backs when used as a seat at one side extends below the seat, and at the other sie forms a support to the shoulders of the passenger, and thus is disposed of without causing inconvenience. When the back-frames are formed into berths, they are retained in their horizontal position by means of the slides or bars *a a*, Fig. 2, which are attached to the arm-frames C by raising them up beneath the backs and turning them so that the projections on the lower ends of the slides shall rest upon a corresponding projection on the arm-frames, as shown at *b b*, Fig. 2; or the edge of the back next to the side of the car may be held by the catches *g g*, as seen in Fig. 1, instead thereof, or by bolting the backs together by sliding bolts *c c*, Fig. 2, or by using suspending cords or rods *h h*, Fig. 2, attached to the roof of the car, or by any other suitable mode that will answer the purpose intended.

E E are cushioned frames of the seats, and F F are supplementary cushioned frames, which are used in connection with E E to form the lower berths. When seats are used, they are folded beneath the cushions E E into recesses in the frames A, as is shown in Fig. 1; but when used to form berths they are opened out, and their width is such as just to fill the space between the cushion E, to which each one is attached, and the corresponding cushion E of the next seat, and in that position they are secured by slide-bolts placed in the frame, or in ~~any~~ other appropriate manner. By this plan two series of beds or berths are formed, one placed above the other, extending, if desired, the entire length of the car; or the passengers occupying the two seats used in connection may, at their option, convert their seats into berths and lie down without incommoding the other passengers.

G G are boxes beneath the seat-frames to contain the pillows, blankets, or other objects. In addition to the upholstery of the seats a mattress and such other bedding as may be desired can be used; but, as this forms no part of my invention, I do not deem it necessary to further allude to it; nor do I confine myself to the particular form of mechanism herein described for connecting and securing the parts to each other and to the car, nor to the particular proportion of the parts shown, as they may be obviously modified and still embrace the fundamental principle of my invention; but I wish it to be distinctly understood that I believe myself to be the first inventor of the method of constructing and arranging in a railroad-car the short seats for two persons, placed transversely on each side of a central passage as ordinarily used, so that the of two seats, in combination with other supplementary parts, as before described, may be converted into a sufficient number of berths extending lengthwise of the car, to accommodate the same number that can be seated; and this method is distinguished from all others before known by the following essential characteristics, namely:

First, the arranging of the seats at such distances apart that two seats occupy a space in the length of the car required for the length of a berth; second, the employment, in combination, of parts of two seats to form each berth; third, the arrangement of the cushions transversely to the berths, so that the length of the seat is the measure of the width of the berth; fourth, the employment of a sufficient amount of cushioned surface similar to that of the seats, in connection with the cushions of the two seats, which, when arranged horizontally side by side, make up a cushioned surface sufficient to form two berths capable of accommodating as many as can be seated; fifth, the employment, in connection with such cushions and auxiliary parts, of suitable devices for fastening and holding the same in proper relation to each other and to the car as will enable them to be used in the manner hereinbefore described, either to form seats or berths.

Having thus set forth the principles of my invention and one form in which I have reduced the same to practice, what I claim, and desire to secure by Letters Patent, is—

1. The forming of berths in railroad-cars by means of the backs of the transverse seats, substantially as described.

2. The forming of berths in railroad-cars by means of the transverse seats, in combination with corresponding supplementary cushioned or uncushioned frames, or their equivalents, to fill up the spaces between the transverse seats, substantially as described.

HENRY B. MYER.

Witnesses:
H. E. MYER,
HENRY WALTER.